UNITED STATES PATENT OFFICE.

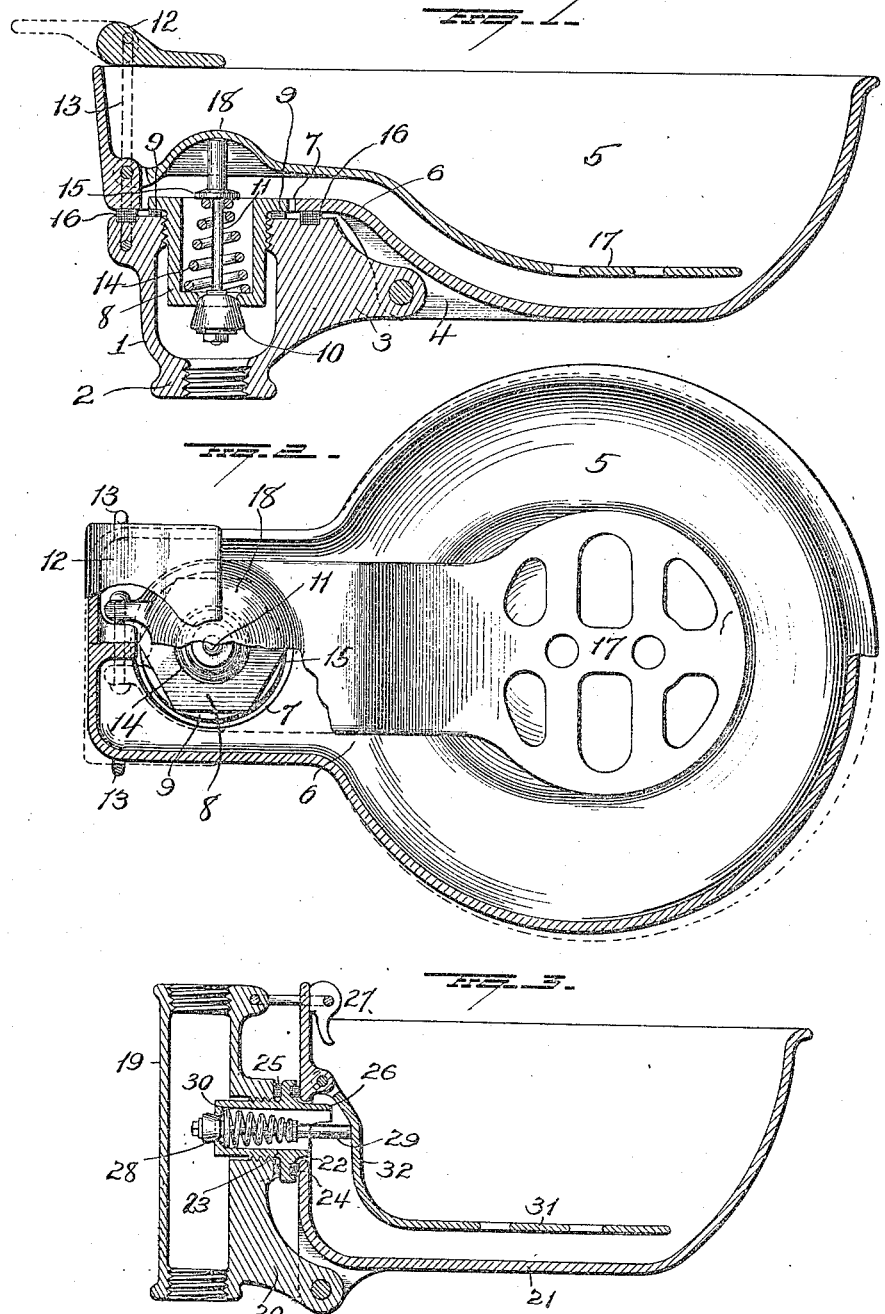

HUGO C. RASSMANN, OF BEAVER DAM, WISCONSIN.

WATERING DEVICE FOR CATTLE.

1,283,301.　　　　　Specification of Letters Patent.　　Patented Oct. 29, 1918.

Application filed October 6, 1917.　Serial No. 195,111.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle,—the object of the invention being to provide simple and efficient means for discharging water through an opening in the bowl and under the control of the animal, the controlling means to be actuated by the animal being located wholly within the bowl.

A further object is to provide a watering device, in which the bowl thereof is hinged to a suitable support and in which the water is supplied through an opening in the bowl and such supply controlled by the animal through the medium of means located wholly within the bowl.

A further object is to provide a watering device of the animal controlled type which shall be compact in construction and occupy a minimum amount of stall space.

With these and other objects in view my invention consists in certain novel features of construction and combinations of parts as hereinafter set forth and pointed out in the claims.

In the accompanying drawings, Figure 1 is a sectional view of a watering device embodying my improvements. Fig. 2 is a plan view, and Fig. 3 is a sectional view illustrating a modification.

1 represents a housing having an internally threaded lower portion 2 for the reception of a suitable water pipe (not shown) on which said housing may be supported. The housing 1 is provided with a lateral arm 3 to which the lug or enlargement 4 on the bottom of bowl 5 is hinged or pivotally attached.

The bottom of the bowl is raised somewhat at its inner end as shown at 6 and this raised portion of the bottom is provided with an opening 7 into which a valve casing 8 enters. This valve casing is threaded exteriorly and is screwed into the housing 1,—the upper end of said casing being made with flat peripheral faces to facilitate the application of a wrench, and between the upper portion of said casing and the upper surface of the housing 1, a suitable packing gasket 9 may be located. Valve casing 8 is provided in its lower end with an opening which is normally closed by a valve 10, the rod 11 of which projects upwardly through said casing and terminates above the same within the bowl when the latter is disposed in its normal horizontal position,—in which position it may be held by means of a cam-latch 12 connected by a bail 13 with the housing 1 or by means of any other suitable latch device. The valve 10 is maintained normally closed by means of a spring 14 located within the valve casing 8, one end of said spring having its bearing in the bottom of said valve casing and the other end bearing against a pin or collar 15 carried by the valve stem or rod.

When the bowl is in its normal horizontal position, possibility of leakage through the opening 7 will be prevented by a packing ring 16 located upon the housing 1, but under ordinary conditions the level of the water in the bowl will not rise over the raised portion 6 of the bottom of the bowl.

A lever-platform 17 is pivotally attached at one end to the inner end of the bowl above the raised bottom portion thereof and its free portion which is to be engaged by the animal is located somewhat above the bottom of the main portion of the bowl. That portion of the lever-platform near its pivoted end and which is disposed over the valve stem 11, is dished upwardly as indicated at 18 so that when the valve is opened by the depression of the lever-platform, the inflowing water will be prevented by said dished portion 18 from undue spattering and from being forced out of the bowl. In other words the dished portion 18 of the lever-platform will serve to direct the inflowing water toward the bottom of the main portion of the bowl.

In the form of the invention shown in Fig. 3, a fount 19 is provided with an arm 20 at its lower end to which latter, one end of a bowl 21 is hinged or pivotally attached. In this form of the invention, the inner end wall of the bowl is provided with an opening 22 which receives one end of a valve casing 23 carried by the fount 19 and between said valve casing and the vertical wall of the bowl, a packing ring 24 may be disposed. I may also employ a packing ring 25 between the valve casing and the fount. The valve casing 23 is provided with a lip 26 which enters the bowl and overhangs the water passage of said valve casing so as to prevent the upward discharge of water and tend to cause a downward discharge thereof toward the bottom of the bowl. A latch device 27, similar to that employed with the construction shown in Fig. 1, may be used for holding the bowl 21 in normal horizontal position. A valve 28 normally closes one end of the valve casing and its stem 29 enters the bowl and projects inwardly beyond the lip 26,—said valve being retained normally seated by means of a spring.

An animal operated lever-platform 31 is located within the bowl and provided at its inner end with an upwardly projecting portion 32 which is pivotally attached to the inner end of the bowl above the valve casing. The upwardly projecting portion of the lever-platform is disposed in front of the valve stem 29 and normally engages the same so that when said lever-platform is depressed, the valve will be opened to permit entrance of water into the bowl. That portion of the part 32 of the lever-platform which is disposed in front of the discharge outlet of the valve casing is made approximately as wide as that portion of the bowl in which it is disposed, and acts as a shield to prevent water from being forced against the face of the animal, and it acts also to deflect the water toward the bottom of the bowl.

Other slight changes may be made in the details of my invention without departing from the spirit thereof or limiting its scope and hence I do not wish to restrict myself to the precise details herein set forth.

Having fully described my invention what I claim as new and desire to secure by Letters-Patent, is:

1. The combination with a water supply device and a bowl pivotally mounted thereon and having an opening to communicate with said water supply device, of a valve for the water supply device having a stem to enter the bowl through said opening, a lever platform pivotally mounted at one end within the bowl near said valve stem, said lever platform adapted to engage and to be sustained in normal position by said valve stem, and means for normally retaining the pivoted bowl in horizontal position.

2. The combination with a fount, of a bowl pivotally supported by said fount and adapted to swing downwardly with relation thereto, said bowl having an opening, a valve supported by said fount and having a stem to project into the bowl, an animal operated device supported in the bowl and adapted to engage said valve stem, and a latch device normally holding the bowl supported in a horizontal position and retaining the valve stem in operative relation to the animal operated device in the bowl.

3. The combination with a fount having an arm, and a bowl pivotally connected with said arm and having an opening, of a valve cage mounted in said fount and communicating with the opening in the bowl, a valve for closing the passage through said cage and having a stem to enter the bowl, an animal operated device supported in the bowl and having a part disposed in line with the valve stem, and means for retaining the bowl in a normal horizontal position.

4. The combination with a fount having an arm, and a bowl pivotally connected with said arm and having an opening in its bottom, of a valve cage mounted in said fount and communicating with the opening in the bottom of the bowl, a valve for closing the passage through said cage and having a stem to enter the bowl, an animal operated device supported in the bowl and having a part disposed over the valve stem, and means for retaining the bowl in a normal horizontal position.

5. The combination with a water supply device, of a bowl pivotally supported by said water supply device and having an opening, a valved casing carried by the water supply device and entering the opening in the bowl, means for maintaining the bowl supported by the water supply device in a normally horizontal position, and an animal operated platform lever pivotally mounted within the bowl and engaging the valve stem of said valved casing.

6. The combination with a housing adapted for connection with a water pipe, of a bowl pivotally connected to said housing and having a raised bottom portion extending over said housing and provided with an opening, a valve casing carried by said housing and entering said opening, a spring pressed valve normally closing said casing and having a stem projecting into the bowl, and an animal operated lever pivotally mounted within the bowl and having a part disposed in front of the discharge outlet of said valve casing and in position to engage the stem of the valve for opening the latter when the lever-platform is depressed.

In testimony whereof I have signed this specification in the presence of two subscribing witnesses.

HUGO C. RASSMANN.

Witnesses:
A. B. CHANDLER,
E. J. LAWRENCE.